US006826554B2

(12) United States Patent
Sone (10) Patent No.: US 6,826,554 B2
(45) Date of Patent: *Nov. 30, 2004

(54) SYSTEM AND METHOD FOR ADAPTIVELY CONFIGURING A SHOPPING DISPLAY IN RESPONSE TO A RECOGNIZED CUSTOMER PROFILE

(75) Inventor: Masahiro Sone, San Diego, CA (US)

(73) Assignee: Fujitsu Limited, Kanagawa (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/106,645

(22) Filed: Jun. 29, 1998

(65) Prior Publication Data

US 2002/0035560 A1 Mar. 21, 2002

(51) Int. Cl.$^7$ .............................. G06F 17/30; G09G 5/08
(52) U.S. Cl. ........................... 707/2; 345/158; 345/745; 345/746; 345/747
(58) Field of Search ............................ 707/1, 5, 104.1, 707/2, 8, 9, 10, 100, 101, 102; 705/1, 17; 235/375, 383, 379, 380; 340/5; 345/158, 744–747

(56) References Cited

U.S. PATENT DOCUMENTS

| | | | |
|---|---|---|---|
| 4,766,295 A | | 8/1988 | Davis et al. |
| 4,973,952 A | | 11/1990 | Malec et al. |
| 4,988,025 A | * | 1/1991 | Lipton et al. ................ 224/411 |
| 5,259,025 A | * | 11/1993 | Monroe et al. ................ 380/23 |
| 5,287,266 A | * | 2/1994 | Malec et al. .................... 705/1 |
| 5,434,776 A | * | 7/1995 | Jain ............................... 704/8 |
| 5,436,436 A | | 7/1995 | Matsukawa .................. 235/380 |
| 5,448,226 A | | 9/1995 | Failing, Jr. et al. ..... 340/825.35 |
| 5,478,989 A | * | 12/1995 | Shepley ....................... 235/375 |

(List continued on next page.)

FOREIGN PATENT DOCUMENTS

| | | |
|---|---|---|
| EP | 0 636 993 A1 | 2/1995 |
| EP | 0 697 670 A1 | 2/1996 |
| WO | WO 97/39398 | 10/1997 |
| WO | WO 98/18094 | 4/1998 |
| WO | WO 98/38589 | 9/1998 |

OTHER PUBLICATIONS

Ware Myers "On Trial at the Summer Olynpic Games: Smart Cards", IEEE 1996, pp. 88–91.*

Carol Hovenga Fancher "In your pocket: smartcards", IEEE 1997, pp. 47–53.*

European Search Report dated Sep. 22, 2003 cited in corresponding European Patent No. 99300854.9–1238, filed Feb. 5, 1999.

Primary Examiner—Uyen Le
(74) Attorney, Agent, or Firm—Christie, Parker & Hale, LLP (57) ABSTRACT

An electronic personal shopping system, communicating between a store platform computer and a number of reconfigurable display terminals located throughout a retail facility, each display terminal associated with an RF interrogator unit which interfaces with a portable customer data card. As a customer enters the interrogator unit's RF field, the customer is identified and the merchandise information message being displayed on the display panel associated with that interrogator unit is adaptively reconfigured to conform to that customer's display preferences in accordance with demographic profile information maintained on record for that customer. The display panel is adaptively reconfigured to display merchandise item information messages in a number of different national languages, weights and measures systems, currency systems, and to display specific messages based on a customer's date of birth, gender or disability status.

32 Claims, 7 Drawing Sheets

U.S. PATENT DOCUMENTS

| | | | |
|---|---|---|---|
| 5,504,675 A | 4/1996 | Cragun et al. | 364/401 |
| 5,541,583 A | 7/1996 | Mandelbaum | 340/825.54 |
| 5,572,653 A | 11/1996 | DeTemple et al. | 395/501 |
| 5,630,068 A | 5/1997 | Vela et al. | 395/201 |
| 5,631,631 A | 5/1997 | Deschenes | 340/572 |
| 5,632,010 A | 5/1997 | Briechele et al. | 345/1 |
| 5,665,951 A | 9/1997 | Newman et al. | 235/375 |
| 5,751,957 A * | 5/1998 | Hiroya et al. | 709/203 |
| 5,867,795 A * | 2/1999 | Novis et al. | 455/566 |
| 5,950,173 A * | 9/1999 | Perkowski | 705/26 |
| 6,023,714 A * | 2/2000 | Hill et al. | 715/513 |
| 6,055,514 A * | 4/2000 | Wren | 705/27 |
| 6,078,928 A * | 6/2000 | Schnase et al. | 707/104 |
| 6,095,423 A * | 8/2000 | Houdeau et al. | 235/487 |
| 6,107,010 A * | 8/2000 | Corniglion et al. | 430/333 |
| 6,123,259 A * | 9/2000 | Ogasawara | 235/380 |
| 6,168,079 B1 * | 1/2001 | Becker et al. | 235/383 |
| 6,587,127 B1 * | 7/2003 | Leeke et al. | 345/765 |

\* cited by examiner

| CUSTOMER ID | LANGUAGE | GENDER | BIRTH DATE | UNITS | CURRENCY | SPECIAL |
|---|---|---|---|---|---|---|
| CUSTOMER ID | LANGUAGE | GENDER | BIRTH DATE | UNITS | CURRENCY | SPECIAL |
| CUSTOMER ID | LANGUAGE | GENDER | BIRTH DATE | UNITS | CURRENCY | SPECIAL |
| ⋮ | ⋮ | ⋮ | ⋮ | ⋮ | ⋮ | ⋮ |
| CUSTOMER ID | LANGUAGE | GENDER | BIRTH DATE | UNITS | CURRENCY | SPECIAL |

SYSTEM AND METHOD FOR ADAPTIVELY CONFIGURING A SHOPPING DISPLAY IN RESPONSE TO A RECOGNIZED CUSTOMER PROFILE

FIELD OF THE INVENTION

The present invention relates generally to an adaptively reconfigurable electronic information display and, more particularly, to a computer based wireless system for presenting information in different languages, forms and formats in response to a customer's individual profile information.

BACKGROUND OF THE INVENTION

Most retail stores today, particularly supermarkets, compete fiercely to attract customers to their stores. One mode of attraction is by offering personalized service which is adapted to meet the particular expectations and needs of each member of a highly diversified clientele.

In a present-day supermarket, merchandise items that are offered for sale are typically associated with some type of display, usually by placing the stock items on a shelf or within a refrigeration or freezer unit and positioning some form of system for displaying prices in proximity to the items. Conventionally, paper or plastic pricing indicators, such as price labels, signage, and the like, are commonly mounted in proximity to the merchandise items, or on the items themselves, to notify customers of an item's price. Pricing indicators often include additional information indicia such as product size, product weight, unit price and other identifying information. While manual marking of merchandise items is the most common method of providing pricing indicators, the trend in the retail industry is moving in the direction of using electronic means, such as electronic display screens, for giving pricing indications and other identifying information at the item's location.

However, in a conventional electronic merchandise display system, the pricing indicators and other identifying information, such as size, weight, and unit price are displayed as a message in a language which is fixed according to the specification of the apparatus. For example, the display screen will display its component information in the Japanese language on a display apparatus which is installed in a supermarket in Japan. Information is displayed in the English language on display units installed in supermarkets in the United States, the United Kingdom, Canada, Australia and the like, while information is displayed in the German language on display terminals installed in supermarkets in Germany.

Likewise, the particular system of weights and measures, as well as the currency associated with particular goods, again necessarily depend on the nationality specification of the apparatus. A display system in a Japanese supermarket will give a product's weights and measures in the metric system and its pricing information in Yen, while a display system in a United States supermarket will display a product's weights and measures using the English system and its pricing information in dollars and cents.

Although the system is very convenient for a completely homogeneous population, it admits to several disadvantages when viewed against the global perspective of trade, tourism and efficient business practices. In particular, International tourism, as well as International business, results in large numbers of non-national language speaking people having to interact with local retail stores in order to make the purchases necessary for day-to-day living. Where item information and item pricing indicators are provided in a language and in a system of weights and measures that are completely unfamiliar to a customer, the customer may become quite confused and unknowingly purchase an undesired item or a desired item in an undesired quantity. In addition, customers which may qualify for special consideration, such as senior citizens, may not be able to communicate that they are entitled to such consideration and, indeed, may not even understand that this is the case.

Further, International corporations which manufacture such display devices must maintain a complete set of language specifications, systems of weights and measures, and the like, for each country in which sales are desired. Because the display units going to different countries are required to be manufactured under different sets of specifications, such International manufacturers are not able to realize the economies of scale that would obtain if they were able to manufacture and export a single general-purpose apparatus, without regard to national language and other national cultural differences.

Accordingly, there exists a need for a shopping display system that is able to be adaptively reconfigured so as to display item pricing indicators and other identifying information such as item size, item weight, unit price, and the like in a language, form, and format which is directed to the specific needs of a particular customer. Such a system should be programmed to recognize and display information in a great variety of national languages, as well as recognize and display information in a number of different systems of weights and measures and in accordance with a number of different currencies. In any particular national environment, the system defaults to displaying information in accordance with that nation's characteristics, but upon interacting with a customer with a different national characteristics, the display system adaptively reconfigured in accordance therewith.

SUMMARY OF THE INVENTION

These and other objects are accomplished in accordance with the present invention by an electronic personal shopping system that is used in a retail facility to adaptively reconfigure a merchandise item display panel to display item pricing indicators and other identifying information in a language, form, and format which is directed to the specific needs of a particular customer. The electronic personal shopping system is programmable to recognize and display information in a great variety of national languages, as well as to recognize and display information in a number of different systems of weights and measures and in accordance with a number of different currencies.

In accordance with one aspect of the invention, the electronic personal shopping system includes a number of individually addressable electronic display units which are mounted at corresponding display locations at which particular merchandise items are offered for purchase. Each of the individually addressable electronic display units is configured to present a particular item information message relating to the merchandise items offered for purchase at that display location. A wireless, RF interrogator unit is associated with and in proximity to each of the individually addressable electronic display units. Each interrogator defines an interrogation area characterized by an RF radiation field.

A store platform computer is coupled to the interrogators and display units by a bi-direction communication bus. A store platform computer receives data communications from the interrogator units and transmits merchandise related information messages to the display units. Each display unit and interrogator is identified by a unique bus address.

The electronic personal shopping system also includes a wireless, RF spectrum portable customer data card which further includes a memory element for storing at least a customer identification (ID). When a customer carrying the card enters an interrogator's radiation field, the interrogator accesses the customer ID from the card's memory and transmits the ID to the store platform computer, along with its bus address. The store platform computer receives the customer ID and consults a database in order to match the customer ID to a customer specific demographic profile message script. The profile message script contains customer specific profile information such as each customer's preferred national language, gender, date of birth, preferred weights and measures system, preferred currency and any indication of special status, such as senior citizen, disability, and the like.

The electronic personal shopping system further includes a database having a number of profile specific data sets, with each data set including an item description table containing information messages for merchandise items offered for purchase at perspective display locations. The information messages of each table differ from one another in that their contents are replicated in different national languages, different systems of weights and measures, different currencies, and the like. A profile decoder circuit decodes a profile message script into selection criteria data which is received by a selection and presentation circuit. The selection and presentation circuit selects a particular one of the profile specific data sets on the basis of the selection criteria data and presents that particular profile specific data set for display.

In a further aspect of the present invention, each customer's demographic profile information is stored in the memory of the portable customer data card and is transmitted to the store computer, along with the customer's ID, upon being accessed by an interrogator following a customer's entry into the interrogator's radiation field.

In an additional aspect of the present invention, selection and criteria data, whether derived from a customer's profile data contained in a database entry or stored in a memory of a portable customer data card, selects appropriate ones of a number of conversion rules, by which a generalized merchandise item description table is converted for display in an appropriate national language, with an appropriate weights and measures system, a preferred currency, and the like. The store platform computer directs the selected merchandise item information message to the display unit associated with the interrogator unit which received the customer's ID, thereby adaptively reconfiguring the display to present a merchandise item information message in a modified form specified by a customer's profile data.

Thus, in accordance with the invention, customers are able to realize substantial labor saving benefits during a shopping trip by being able to view (or hear, in the case of the vision impaired) item information and item pricing indicators in a language, currency and a system of weights and measures that are familiar to the customer. An international customer is, thus, able to interact with a local retail store in order to make certain purchases necessary for day-to-day living. In addition, non-native customers, which may qualify for special consideration, such as senior citizens, are able to determine that they are entitled to such consideration and have the information presented to them in a manner which is understandable and easily perceived, even by those with vision or hearing impairment.

BRIEF DESCRIPTION OF THE DRAWINGS

These and other features, aspects and advantages of the present invention will be more fully understood when considered with respect to the following detailed description, appended claims and accompanying drawings wherein:

FIG. 4b is a schematic flow chart depicting operation of the interface circuitry of FIG. 4a;

FIG. 5b is a schematic flow chart depicting operation of the interface circuitry of FIG. 5a;

FIG. 6b is a schematic flow chart depicting operation of the interface circuitry of FIG. 6a;

FIG. 7b is a schematic flow chart depicting operation of the interface circuitry of FIG. 7a.

DETAILED DESCRIPTION OF THE INVENTION

Figure 1:
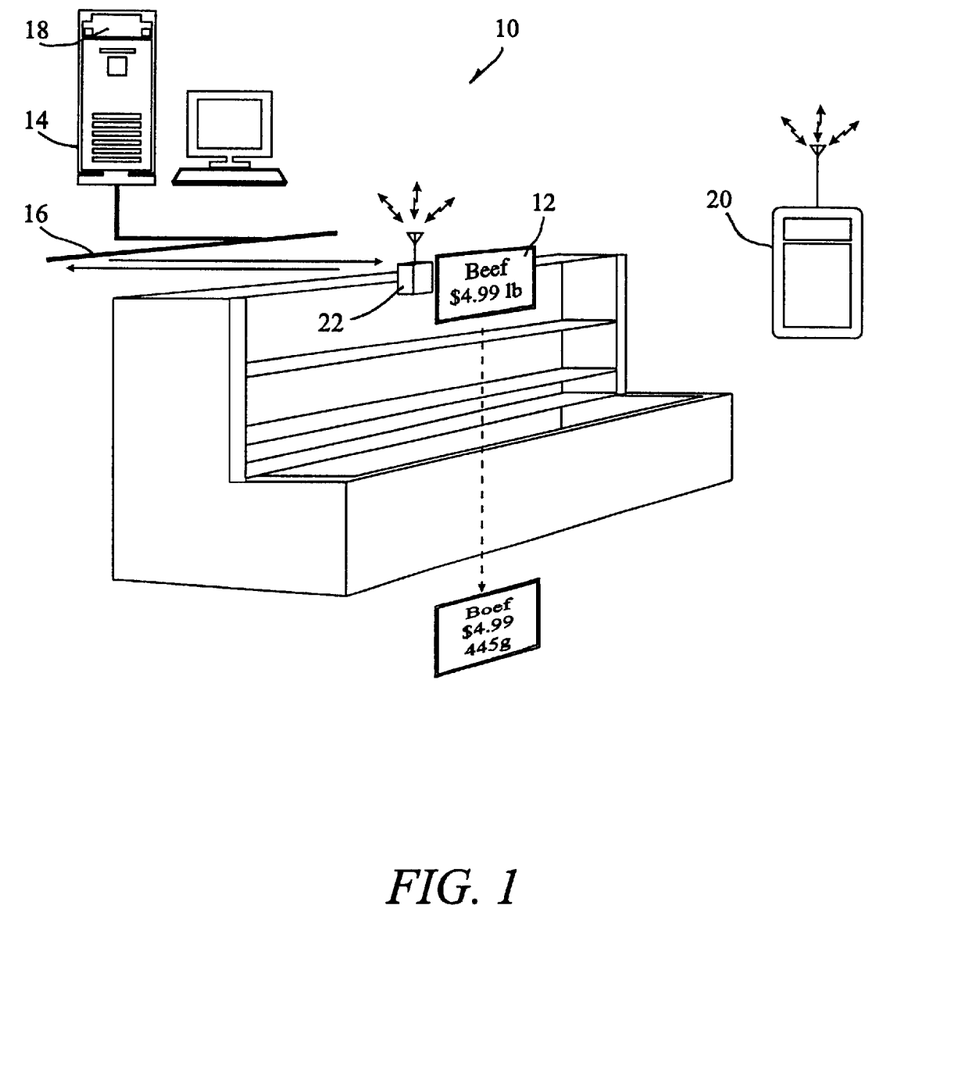
FIG. 1 is a semi-schematic perspective view of the shopping display system in accordance with the present invention.

One particular embodiment of an adaptively reconfigurable electronic information display system embodying the principles of the invention is illustrated, in simplified form, in FIG. 1. The information display system 10 of the illustrated embodiment is suitably employed in a retail store such as a supermarket, where items of merchandise are displayed on shelves for easy visibility and access by a customer. Likewise, certain items of merchandise which require refrigeration or freezing are disposed in temperature controlled showcases and are arranged for relatively easy visibility and access by a consumer. In either case, the electronic display system 10 includes a number of electronic display panels 12 which are mounted along display shelves or otherwise suitably affixed to particular locations about temperature controlled showcases, in locations proximate to the goods about which they display information.

As depicted in FIG. 1, display panels 12 are electrically connected to a store's central computer system 14 by means of a signal bus 16, configured to support and operate as a local area network, such as a 10/100BASE-T LAN. In the illustrated embodiment, the store central computer 14 is able to communicate with the display panels 12 by accessing the appropriate signal line on the local area network communication's backbone. Information displayed on the display panels 12 is identified to the particular goods in proximity to the display panel. The content of the information is provided by the store central computer 14 which reads it from a merchandise item database 18. In a manner to be described in greater detail below, the form of the information displayed by the display panels 12 will vary greatly depending on the particular informational needs of individual customers. For example, and as depicted in FIG. 1, the display panel 12 might be default configured to display information relating to, say beef, in the English language, using Dollars as a currency and pounds as a unit of measure. When a non-English speaking customer, for example a French speaker, were to require information, the display panel 12 is adaptively reconfigurable to display the necessary information in French (BOEF) using Francs as the currency and grams as the units of measure.

Adaptive reconfiguration of the display panel 12 is an autonomous process, requiring only that a customer equipped with a wireless RFID card 20 in accordance with the invention, approach close enough to the display panel 12 that the wireless card is able to interact with an RF interrogator and receiver 22. The interrogator and RF receiver might be mounted in a suitable location either along a store shelf or on the temperature controlled showcase, and a location proximate to a display panel. The interrogator and RF receiver might also be affixed directly to a display panel or even formed as a part of the display panel. However provided, the interrogator and RF receiver is preferably located as close as possible to its corresponding display panel. It should be pointed out that each of the display panels provided throughout a supermarket will have a corresponding interrogator and RF receiver associated with it. The display panels in combination with their associated interrogators and RF receivers share unique bus addresses which are pre-assigned thereto for identification purposes. Unique bus addresses, pre-assigned to each display panel and RF interrogator and receiver combination allow each of the display panels to be individually accessed by the store computer in order to display information relating to the particular product, or products, in which they are in proximity. Thus, a display panel affixed in the vicinity of the fresh fruit section of a produce aisle would necessarily display information relating to that product, i.e., fresh fruit. Likewise, a display panel affixed in the vicinity of the milk section of the dairy shelves would display information relating to that product. Assignment of the unique bus addresses to each display panel and identifying the nature of the product, or products, which each display panel is referring, can be carried out by having store management personnel execute a simple application program hosted on the store's computer system.

Figure 2:
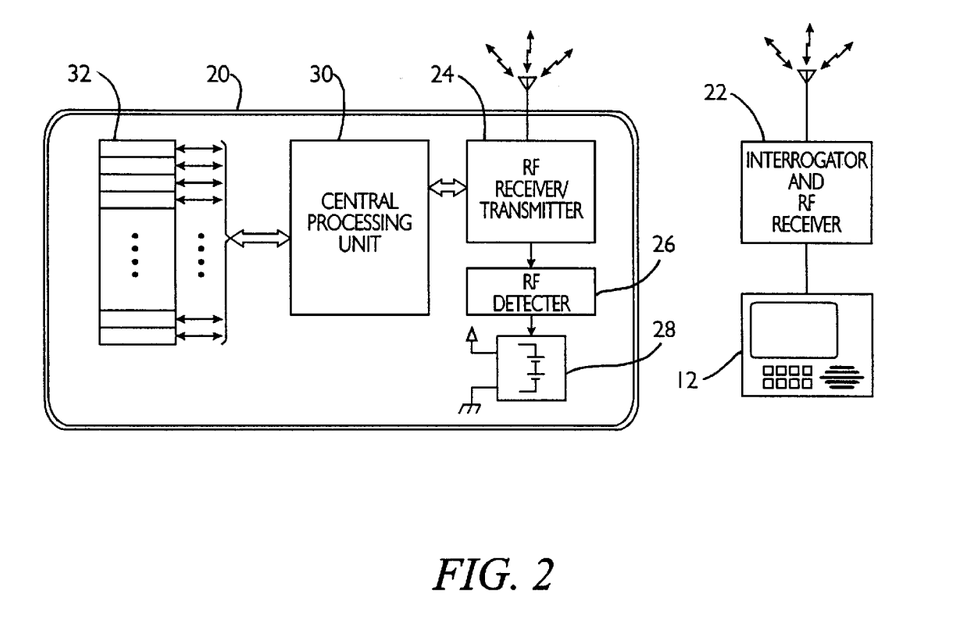
FIG. 2 is a semi-schematic block diagram of an interrogation system including a wireless IC identification card in accordance with the present invention.

A smart card, or customer ID card, suitable for use in connection with the adaptively reconfigurable shopping display, is depicted in semi-schematic block form in FIG. 2. The ID card 20 suitably comprises a personal memory card or data card which looks and feels much like an ordinary credit card. Each customer ID card includes an associated RF receiver/transmitter 24 which communicates data information and ID signals in response to being interrogated by an interrogator 22 coupled to an adaptively reconfigurable display 12. The RF receiver/transmitter 24 suitably communicates information over an RF frequency band in the range of from about 900 MHz to about 2.4 GHz, and may be interrogated by and provide information to any one of a multiplicity of interrogators 22 coupled to display panels 12 throughout the store. Preferably, the RF receiver/transmitter 24 communicates information at an RF frequency of about 2.4 GHz.

Once the customer ID card 20 receives an interrogation signal, the RF receiver/transmitter 24 may activate an RF detector circuit 26 which, in turn, activates a power supply 28, such as a battery or a capacitor discharge system. The power supply 28 provides operating power to a central processing unit 30 which controls read/write communications between the ID card 20 and the RF receiver provided in the interrogator unit 22. In order to save energy and prolong battery life, the ID card is normally in the off state. When radiated energy is received from an interrogator, the ID card's power supply is turned on when the card 20 is within a certain radius of the radiation source (the antenna) of the interrogator. When the ID card is outside the energy radius of an interrogator, power to all of the circuitry on the card is turned off, thereby extending the operating life of the power supply 28 if the power supply were battery powered. A typical activation radius is normally in the range of a few feet, but may be as large as 5 meters, depending on the radiative power of the interrogator 22 and the RF receiver/transmitter 24 of the ID card.

As a card 20 is activated by an interrogator 22, and power is supplied to the central processing unit 30, the central processing unit accesses a memory store 32 and controls transmission of a customer ID and/or customer profile information by the card to the RF receiver unit of the interrogator 22. The memory store 32 suitably comprises an integrated circuit memory, such as an electrically erasable field-programmable read-only memory (EEPROM) or a Flash ROM (FROM). The memory store 32 may also suitably include circuitry for inductively receiving an RF power signal, or include circuitry for receiving battery power from the power supply unit 28 of the ID card 20. It should be mentioned here that the central processing unit 30 operates to control operation of the ID card 20 in accordance with pre-programmed operating instructions. The operational code, or firmware for the central processing unit 30 is typically stored in and accessed from an on-chip instruction set ROM which is commonly included in almost all present day integrated circuit processors. It will be evident to one having skill in the art, that under certain circumstances, this on-chip instruction set ROM might, indeed, be used as the memory store 32, in place of a separate solution. The on-chip instruction set ROM would necessarily be required to have a relatively large storage capacity in excess of that required to hold the processor's operating system instruction set. In addition, on-chip memory is typically implemented as non-erasable read-only-memory (ROM), in order to minimize cost. The non-erasable nature of this memory requires that the information stored therein be fixed in content. For this reason, a memory store 32 separate from the central processing unit 30 is preferable.

As will be described in greater detail below, the size of the memory store 32 depends on the amount of information that is deemed appropriate for the card to hold. For example, in one embodiment, the memory store 32 is configured to hold a 16 character customer ID which is accessed by the central processing unit 30 and provided to the RF receiver/transmitter 24 which transmits the ID to the RF receiver portion of the interrogator 22. The information is passed by the interrogator unit to the store computer (14 of FIG. 1) where it is matched to corresponding customer profile information contained in the store database (18 of FIG. 1).

Figure 3A:
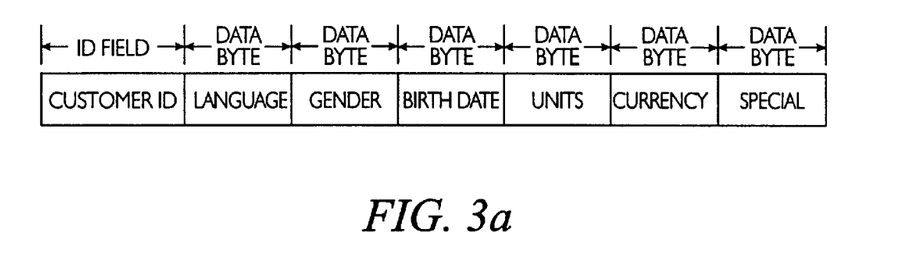
FIG. 3a is a semi-schematic block diagram of profile category message data transmitted between the IC identification card and the interrogation system.

In an alternative embodiment, the memory store 32 is constructed with a storage capacity suitable for holding the 16 character customer ID field, along with an additional plurality of data bytes, each of which correspond to a particular customer profile metric. FIG. 3a illustrates a semi-schematic conceptual layout diagram of a generalized message that might be transmitted by a customer ID card to an interrogator which, in turn, passes the message to a store computer system (14 of FIG. 1). The generalized message of FIG. 3a suitably comprises a first ID field, comprising a 16 character customer ID which is uniquely assigned to each customer. Following the 16 character ID field, a plurality of data bytes each contain certain indicia relating to particular aspects of a customer's profile information. For example, following the ID field in the embodiment of FIG. 3a, the first data byte comprises a language data byte indicating the national language in which the customer is most comfortable communicating. If the data byte is a conventional 8-bit byte, the data byte is capable of resolving up to 256 different national languages. Following the national language byte, the message embodiment of FIG. 3a includes a data field containing information which indicates the customer's gender. Information contained in the gender field might be particularly useful to both the store and to the consumer. For example, informational messages displayed on the adaptively configureable display screen are able to be modified in content, in a manner to be described in greater detail below, to direct them more appropriately to either a male or a female. Several non-English languages expressly include gender identification in various forms of addresses, particularly the second person singular and second person plural. Personalizing messages on the basis on the basis of gender, as well as national language, would tend to make a customer feel considerably more comfortable in making purchasing decisions.

The next data field in the exemplary message embodiment of FIG. 3a is a date-of-birth (birth date) field. The birth date field is particularly useful in indicating certain price discounts, and the like, available to, for example, senior citizens. In addition, if the birth date field indicates that the customer is an older person, the information displayed on the adaptively reconfigurable display screen might be presented with a considerably larger font size so as to take into account an older person's potentially declining visual acuity. Following the birth date field is a units field which indicates the system of weights and measures most familiar to the consumer. The units field is followed by a currency field which, likewise, indicates the currency denominations in which the customer is most comfortable in dealing. A special field is included in the exemplary message embodiment of FIG. 3a and is provided for indicating a special customer profile metric, such as a disability status. In particular, if a customer has severely impaired vision, the information provided to the adaptively reconfigurable display by the store computer is also output as a voice message which provides information to the customer over a speaker.

It will be evident to those having skill in the art that the various data fields comprising the exemplary message embodiment of FIG. 3a are described for purposes of illustration and are not intended to limit the types and amounts of information that might comprise a customer profile. The lengths of each data field comprising the message may be suitably adjusted so as to fit the types of information contained therein. In particular, the gender field need only comprise a single bit; a "1" indicating a male, a "0" indicating a female, for example. Certain of the data fields might be combined in order to minimize data storage requirements of the memory store (32 of FIG. 2) of the customer ID card. The language, units and currency fields might be combined into a single field indicating a consumer's nationality. However, a single nationality entry would not be suitable for citizens of, for example, Switzerland which has an official language, but where its citizens preferably speak one of three different languages. Likewise, with the coming of the Euro currency, a particular consumer might be more comfortable in dealing in his or her national currency. Thus, no matter how expressed, all that is required in accordance with the invention is information expressed in a predetermined form and format which contains various indicia or metrics which serve to describe a particular customer's demographics and personal preferences, i.e., a customer's profile.

Figure 3B:
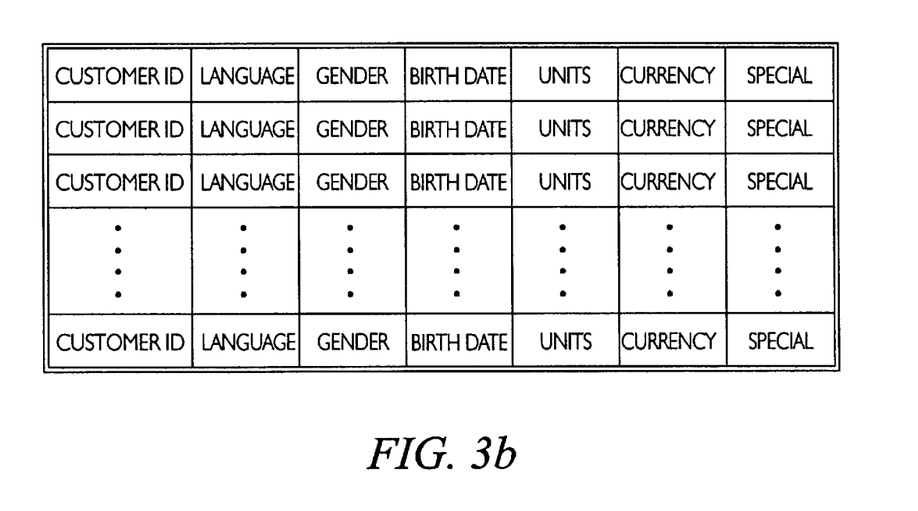
FIG. 3b is a semi-schematic block diagram of an exemplary profile category conversion table in accordance with the present invention.

Turning now to FIG. 3b, there is depicted a semi-schematic generalized profile information message file which is used by the system of the present invention in connection with a customer ID card configured to transmit only customer ID information upon interrogation by an interrogator unit. As will be described in greater detail below, the 16 character customer ID is received by the interrogator and directed to a store computer system (14 of FIG. 1) over a local area network bus (16 of FIG. 1). The store computer system uses the customer ID to access a database and matches the customer ID with an appropriate customer profile message script which comprises customer profile information such as that described above. Suitably, the customer profile message script would include a language field, gender field, birth date field, a field identifying a system of weights and measures, a preferred currency field and a special status field, among others. The customer profile message script is laid out and formatted in a manner similar to the exemplary message of FIG. 3a and would be implemented in a system in which it was desirable to minimize the memory storage capacity (the cost) of a customer ID card.

Figure 4A:
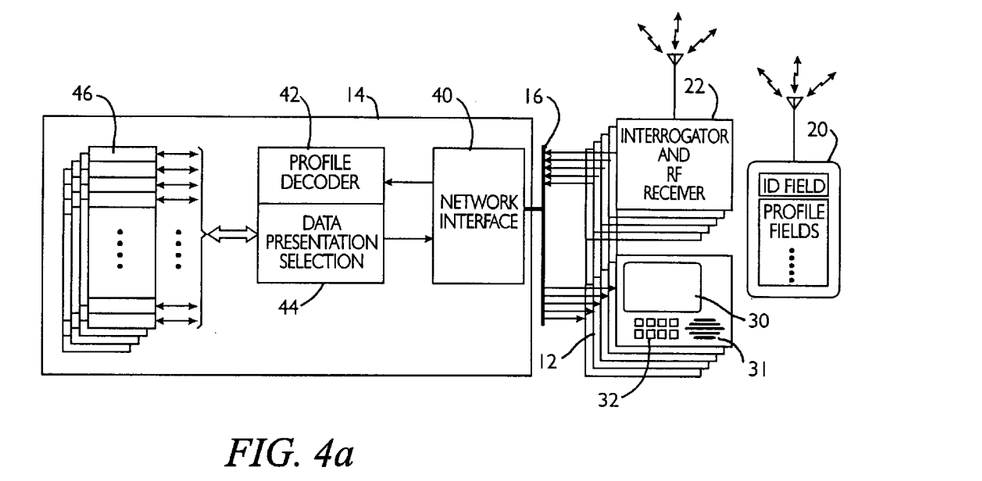
FIG. 4a is a semi-schematic block diagram of a first embodiment of exemplary interface circuitry for recognizing profile category message data and adaptively reconfiguring a shopping display in response thereto.

A first embodiment of a system for adaptively reconfiguring a shopping display in response to a particular recognized customer profile is depicted in semi-schematic block diagram form in FIG. 4a. The system is configured to operate in combination with a customer ID card 20 of the type adapted to host both customer ID information as well as a plurality of customer profile information fields in its memory store. The ID card 20 is activated by any one of a number of RF frequency interrogator and RF receiver units 22, each of which is associated with a corresponding adaptively configureable display panel 12. The display panel suitably comprises a display screen 30 capable of displaying graphic and alpha-numeric information and preferably comprises a VGA or SVGA liquid-crystal-display (LCD) screen. Pressure sensitive (touch screen) technology, or conventional push-buttons 32, may be incorporated into the display panel 12 so that a shopper may manually operate the device. The display panel 12 also includes a speaker 31 which is able to present voice information to a customer corresponding to the graphic or alpha-numeric information displayed on the screen 30.

Customer ID data and customer profile information fields, transmitted to the interrogator and RF receiver unit 22 are directed to a host computer system 14 over an interface bus 16. Although communication between an interrogator and RF receiver unit 22 and the host computer system 14 may be implemented using a number of suitable methods, information transfer is preferably achieved using a local area network configuration communicating in accordance with the 10/100BASE-T LAN protocol. In the embodiment of FIG. 4a, the network bus 16 is coupled to the host computer system 14 through a network interface circuit 40. A customer's ID and a customer's profile information is directed through the network interface 40 to a profile decoder circuit 42 which passes the information to a data presentation selection circuit 44.

A multiplicity of customer profile specific data sets 46 are stored as a database in a mass storage system, such as a hard disk drive, coupled to the store computer system 14 as a peripheral device. The customer profile specific data set would include, for example, an Item Description Table in each of a number of different national languages. The Item Description Table is generally similar to a conventional Price Look Up (PLU) Table, but need only contain a sub-set of the information commonly entered in a PLU Table for merchandise items. For example, a typical PLU Table might include a particular item's UPC or SKU number, an item description (i.e., toothpaste), a department code, the item's tax rate, the item's regular price, a discounted price, and an incentive marker if appropriate (i.e., buy one, get one free). An Item Description Table, on the other hand, need only include the types of product information which would normally be shown on a display screen. Such information would include at least the item description (i.e., top sirloin), the item price and weights and measures metric (i.e., $3.99 per lb), as well as an incentive indication (today only, 50% off). In addition to the item specific information, each entry in the table is necessarily identified to a particular display panel and interrogator unit so that information relating to particular items is directed to the appropriate display. Identification of entries to display/interrogator units can be as simple as heading each entry with its corresponding display's bus address. Thus, display number seventy-seven, located in the dairy aisle, for example, will receive Item Description Table entry number seventy-seven, which might read "Milk, $2.29/gal." (In the English language version). It will be understood that forming the Item Description Table with a generally reduced entry set, as compared to a conventional PLU Table, allows an individual table to reside in a smaller memory area, and further allows a given memory size to accommodate tables constructed of, for example, a greater number of national languages.

In other words, if the customer was an English language speaker and was in proximity to a display panel/interrogator unit near the beef showcase, the data presentation selection circuit 44 would access a customer profile information set which included an Item Description Table defined in the English language. The English language Item Description Table would contain an entry for "beef". Conversely, if the customer were a French speaker, the data presentation selection circuit 44 would access an Item Description Table which contained store items identified in French, from the customer profile specific data sets. The entry for beef in that data set would be "boef".

Following selection of the appropriate data format, the selected data is extracted from the customer profile specific data sets by the data presentation selection circuit 44 and redirected to the network interface circuit 40 for transmission over the network bus 16 to the appropriate display panel 12 associated with the interrogator and RF receiver unit 22 which obtained the customer profile information. The transmitted information is then displayed, sounded out, or alternatively, printed out to the customer.

Entries in the customer profile specific data set 46 might include, not only a store's Item Description Table replicated in various national languages, but also display parameter codes used for determining how information, contained in an Item Description Table, is displayed. Since operating systems, such as UNIX or WindowsNT, comprise a rather large selection of internal font characters capable of being accessed in a variety of sizes, display parameter codes are used to select appropriate fonts for display in an appropriate size. For example, if a particular customer's profile information indicates that the customer is a Japanese teen, the data presentation selection circuit 44 evaluates the display parameter code and may well instruct the operating system to select a font character code corresponding to Japanese Hiragana characters. If the customer was a Japanese adult, their display parameter code might have the data presentation selection circuit 44 instruct the operating system to select a font character code corresponding to Japanese Kanji characters. Likewise, if a particular customer's profile information indicates that the customer is a senior citizen, the data presentation selection circuit 44 may well instruct the operating system to select a font with a larger point size, making it easier for an older person to read.

Figure 4B:
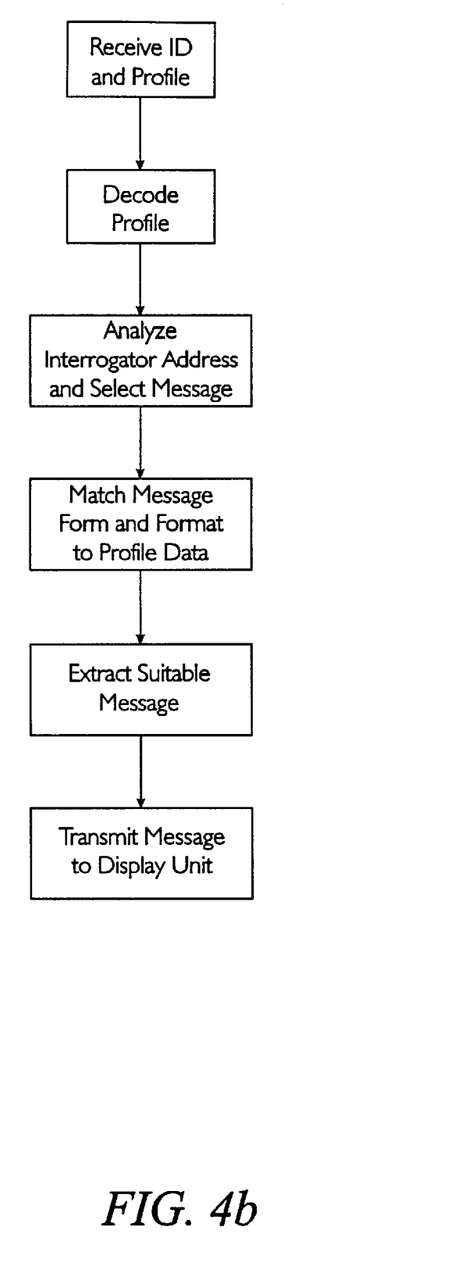

In accordance with practice of principles of the invention, then, the system for adaptively configuring a shopping display in response to a recognized customer profile as illustrated in FIG. 4a would function in accordance with the schematic flow chart illustrated in FIG. 4b. Operation of the system of FIG. 4a would begin when a customer, carrying a customer ID card in accordance with the invention, enters an RF field generated by an interrogator and RF receiver unit. The customer's ID card responds to the interrogator and transmits a customer's ID field, followed by a message script which includes the various data bytes comprising that customer's profile information. The interrogator unit transmits the customer data to a store computer, which hosts the novel system as an application program. In addition to transmitting customer information, each interrogator must necessarily transmit some form of self-identification to the store computer so that the store computer is able to recognize its location and the types of products associated with that interrogator. The interrogator might transmit its network address or, alternatively, a unique unit ID such that the system can transmit the appropriate display data to the appropriate display unit.

Following transmission of the customer profile information to the system, the customer profile information is decoded by a profile decoder and the decoded information is provided to a data presentation and selection circuit, as described above. Profile decoding involves reading a particular data byte of a profile message and associating its digital code to a particular language, gender, date-of-birth, and the like. In the simplest case, i.e., a 2-bit gender byte (or nibble), profile decoding might involve nothing more than associating a "1" bit with a male and a "0" bit with a female. Likewise, a language byte written as 08h, when decoded, might indicate Spanish or Portuguese. The data presentation and selection circuit then extracts the appropriate customer specific data set, which contains information in the appropriate national language, font size, and the like, and routes this information to a corresponding display unit associated with the interrogator which initiated the process. The display unit is, thus, adaptively configured to provide a particular customer with shopping information in a particular desired form and format, in response to that customer's demographic profile.

Figure 5A:
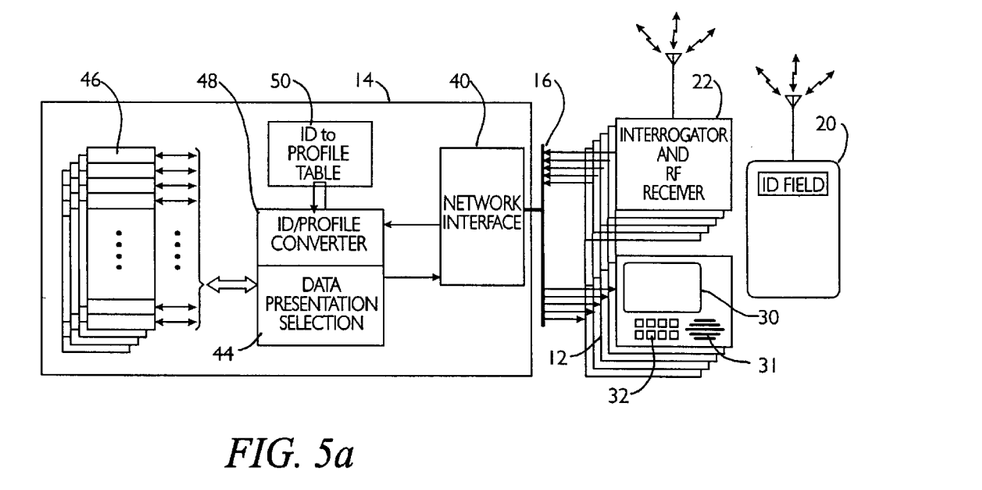
FIG. 5a is a semi-schematic block diagram of an alternative embodiment of exemplary interface circuitry for converting a customer ID to a customer profile and adaptively reconfiguring a shopping display in response thereto.

A second embodiment of a system for adaptively reconfiguring a shopping display in response to a particular recognized customer profile is depicted in semi-schematic block diagram form in FIG. 5a. In contrast to the first illustrated embodiment of FIG. 4a, the illustrated embodiment of FIG. 5a is configured to operate in combination with a customer ID card 20 of the type adapted to host only a customer ID field. As in the previous illustrated embodiment, the ID card 20 is activated by a customer's entry into the RF field of a particular interrogator and RF receiver unit 22 which is associated with a corresponding adaptively configureable display panel 12.

As the interrogator and RF receiver unit 22 receives the customer ID information from the customer ID card, the interrogator unit 22 directs the customer ID information to the store's computer system 14 over a network interface bus 16. As was the case in the embodiment of FIG. 4a, the network bus 16 of FIG. 5a is coupled to the host computer system 14 through a network interface circuit 40. The customer ID information is directed through the network interface 40 to a customer ID and profile converter 48. Customer ID information is then directed to an ID to profile conversion table 50 which has a form generally similar to the semi-schematic block diagram of FIG. 3b. The ID to profile conversion table matches a customer ID received by an interrogator unit to a list of customer ID's comprising the table. Upon finding a match, the profile information script associated with that customer ID is provided to the customer ID and profile converter 48 which converts the profile codes into their associated languages, genders, ages, and the like.

Following conversion of the profile codes, the profile information is directed to a data presentation and selection circuit 44 which, in turn, accesses a suitable and corresponding one of a multiplicity of customer profile specific data sets 46.

The particular customer profile specific data set, identified by the customer's profile information is then redirected through the network interface to the network bus 16 and, thence, to the appropriate display panel 12 associated with the interrogator and RF receiver unit 22 which obtained the customer profile information.

Figure 5B:
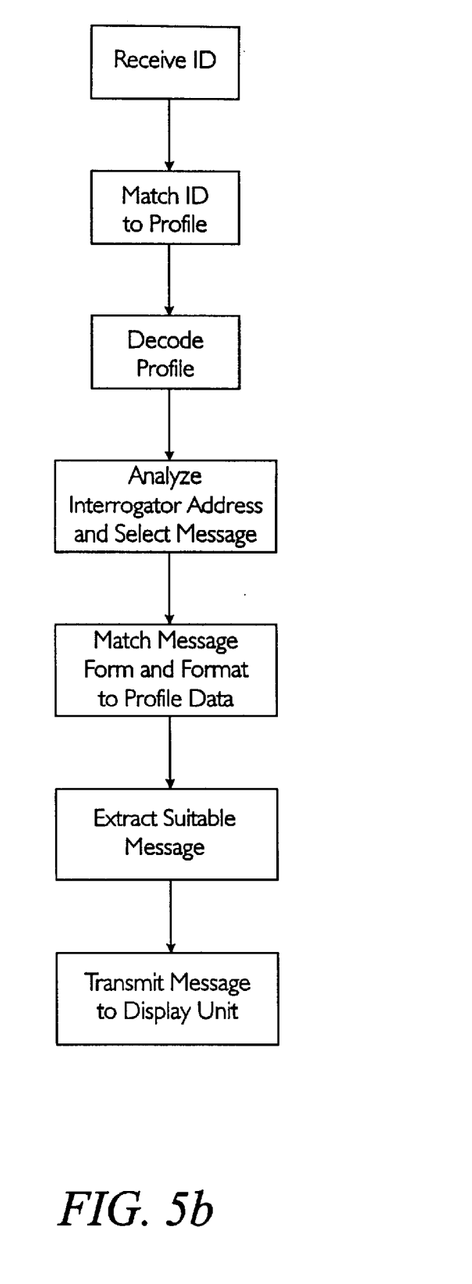

The similarity between the illustrated embodiment of FIG. 5a and the illustrated embodiment of FIG. 4a can be seen by inspecting the schematic flow chart of FIG. 5b, depicting operation of the interface circuitry of 5a. The exemplary flow chart of FIG. 5b is similar to the schematic flow chart of FIG. 4b, but with the addition of the steps associated with matching a customer ID received from the interrogator unit to an entry in the ID to profile conversion table and the extraction of associated profile information from the table.

Figure 6A:
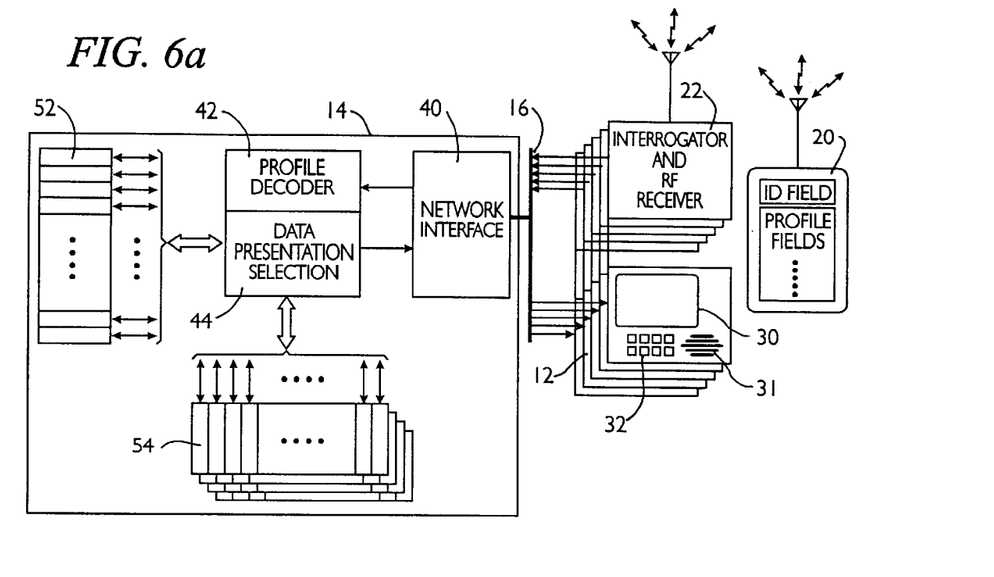
FIG. 6a is a semi-schematic block diagram of a further embodiment of exemplary interface circuitry for recognizing profile category message data and adaptively reconfiguring a shopping display in response thereto.
Figure 6B:
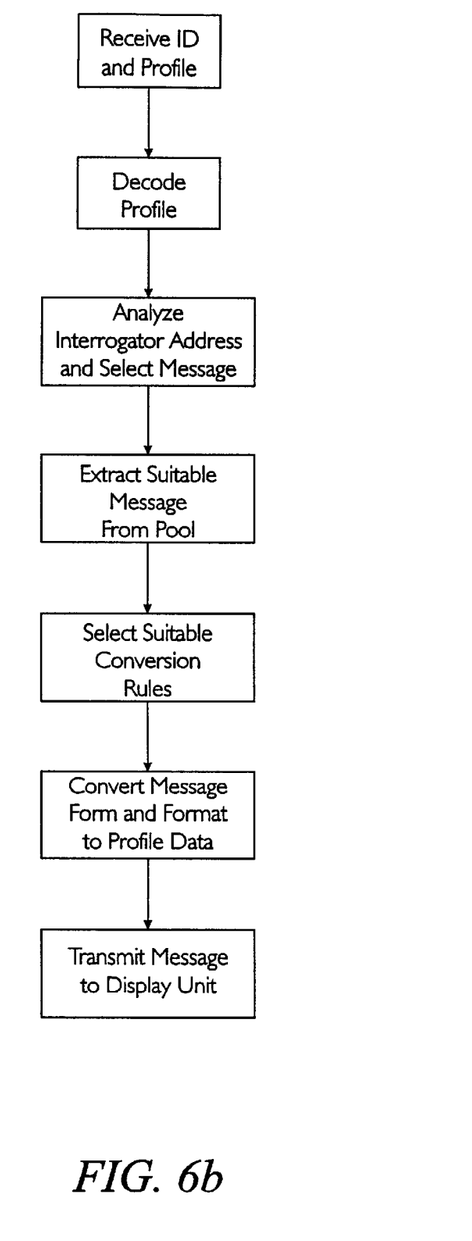

A slightly more sophisticated embodiment of the present invention is depicted in semi-schematic block diagram form in FIG. 6a, and operates in conjunction with the schematic flow chart depicted in FIG. 6b. The system of FIGS. 6a and 6b is configured to operate in conjunction with a customer ID card 20 of the type adapted to host both customer ID information as well as customer profile information fields in its memory store. When entering the RF field generated by an interrogator unit 22 associated with a corresponding display panel 12, the customer's ID card 20 transmits the customer ID and profile information to the interrogator unit 22 which, in turn, directs the information to a host computer system 14 over a network interface bus 16. As was the case in the previous embodiments, the interrogator unit 22 will necessarily preface the customer data with some form of self-identification, such as its network address so that the computer system 14 is able to identify the source of the transmission and can determine where to send any resulting output data.

Customer data, comprising the customer's ID and the customer's profile information, is received by network interface, by which the computer system 14 is coupled to the network bus 16. Customer data is then routed to a profile decoder 42 which converts the profile codes into signals indicative of a particular language, gender, and the like. Decoded profile information is then sent to a data presentation and selection circuit 44 which functions to determine the form and format of product related information which will be sent to the display panel 12 associated with the interrogator unit 22 which initiated the process.

In contrast to the prior embodiments of FIGS. 4a and 5a, the embodiment of FIG. 6a does not access a multiplicity of customer profile specific data sets, but rather uses the data presentation and selection function to select particular ones of a multiplicity of information format conversion rules 54 which are applied to a basic information content comprising an information pool 52. The information pool 52 might be nothing more than a file comprising various entries which pertain to the names, prices, systems of weights and measures, and the like for the various goods in a particular store. Each of the entries might be initially coded in the English language, with the prices in dollars and cents and the weights and measures in the English system, i.e., pounds, ounces, gallons, pints and the like. The information contained in the information pool 52 is converted into an appropriate form and format, in accordance with a particular customer's profile information, by applying particular ones of the multiplicity of information format conversion rules 50. An exemplary conversion rule might be a formula for converting the dry weight of a particular piece of merchandise from English pounds to metric grams of kilograms. In its simplest form, a pounds to kilograms conversion rule would be a simple code string instructing the system to divide a numerical value expressed in pounds by 2.2 in order to obtain a numerical value in kilograms.

Likewise, a language information format conversion rule would comprise a dictionary giving the correct spelling and transliteration of each of the English terms comprising the information pool 52 in the various national languages selected for support by the system. Dictionary entries could be as simple as a number of ASCII code characters stating, for example, "milk=leche, lait, milch, moloko, etc.". Alternatively, the dictionary entries can be as sophisticated as a translation subroutine, similar to many commercially available text translators, which is invoked by the data presentation and selection section 44 upon receipt of the desired language from the profiled decoder 42.

In summary, the data presentation selection section accesses the information pool 52 in order to extract therefrom the appropriate message to be sent to the display panel 12 associated with the interrogator 22 which initiated the process. Once the appropriate message has been extracted from the information pool 52, the information is converted into an appropriate form and format using the appropriate ones of the information format conversion rules 50, which are determined by the profile codes of a customer ID card.

Once the message is placed into its desired form and format, the message is directed by the network interface circuit 40 across the network bus 16 to the display panel 12 which is associated with the interrogator unit 22 that initiated the process by accessing the customer's ID and profile information.

Figure 7A:
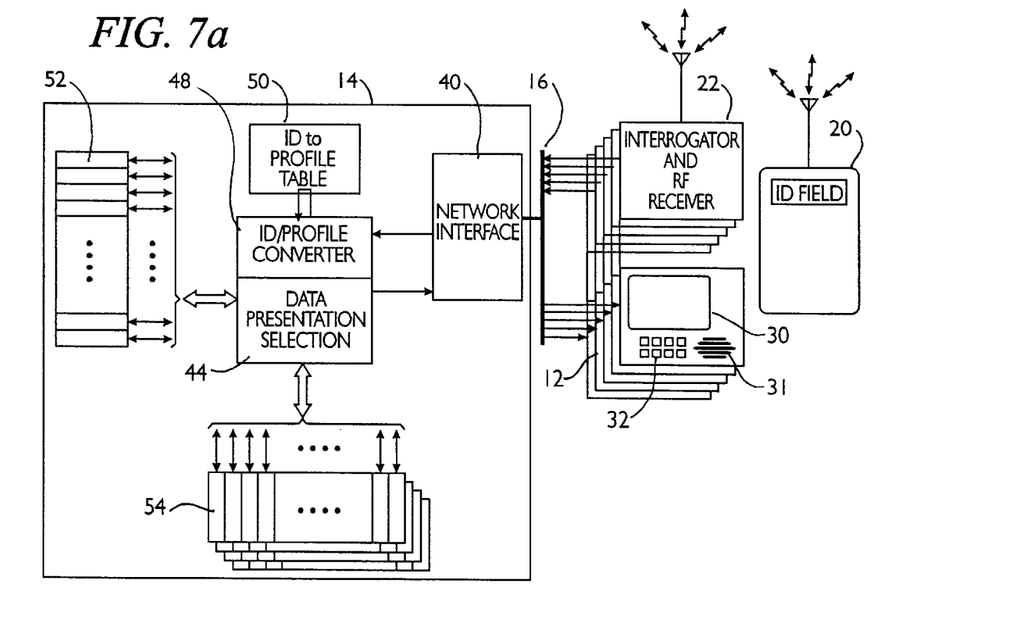
FIG. 7a is a semi-schematic block diagram of a further embodiment of exemplary interface circuitry including an information converter subsection for adaptively reconfiguring a shopping display in accordance with conversion rules.
Figure 7B:
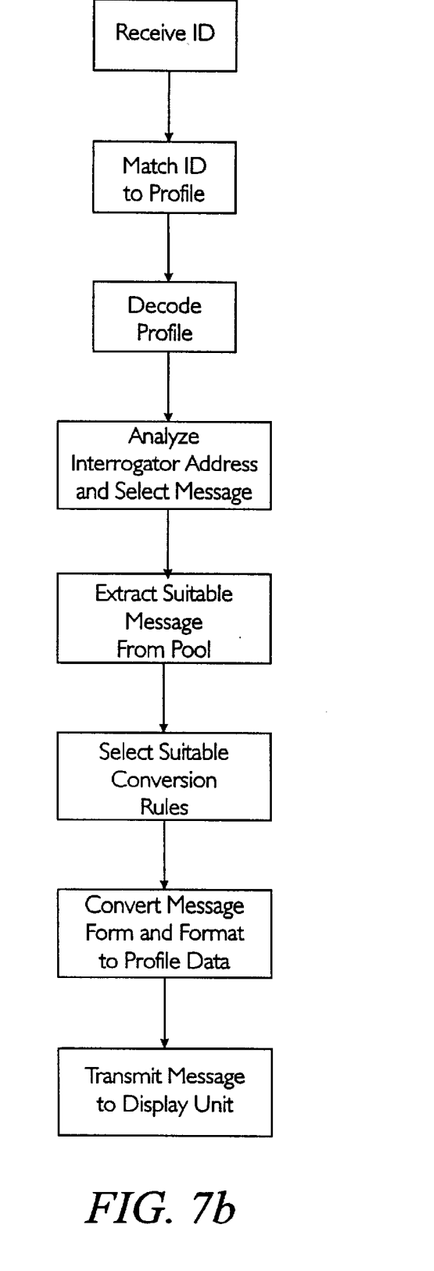

An additional embodiment of the present invention is depicted in semi-schematic block diagram form in FIG. 7a, and operates in conjunction with the schematic flow chart depicted in FIG. 7b. In contrast to the prior described embodiment, the system of FIGS. 7a and 7b is configured to operate in conjunction with a customer ID card 20 of the type adapted to host only a customer ID field. As in all prior cases, the ID card 20 is activated by a customer's entry into the RF field of a particular interrogator and RF receiver unit 22 which is associated with a corresponding adaptively configureable display panel 12.

As the interrogator and RF receiver unit 22 receives the customer ID information from the customer ID card, the interrogator unit 22 directs the customer ID information to the store's computer system 14 over a network interface bus 16. As was the case in the embodiment of FIG. 6a, the network bus 16 of FIG. 7a is coupled to the host computer system 14 through a network interface circuit 40. The network interface circuit 40 functions to manage the network bus 16, and identify the source and/or destination of the various signals transiting the bus. Customer ID information is directed through the network interface 40 to a customer ID and profile converter 48 in a manner similar to the embodiment of FIG. 5a. Customer ID information is then directed to an ID to profile conversion table 50 which has a conceptual form generally similar to the semi-schematic block diagram of FIG. 3b. The ID to profile conversion table 50 matches the customer ID received by the interrogator unit to a list of customer IDs comprising the table. Upon finding a match, the profile information script associated with that customer ID is read from the table by the customer ID and profile converter 48 which then converts the profile codes into signals corresponding to their associated languages, genders, ages, and the like.

Following conversion of the profile codes, the profile information is directed to a data presentation and selection unit 44 which evaluates the converted profile codes for content and selects respective ones of a multiplicity of information format conversion rules 50 by which information stored in a basic information pool 52 is converted to the appropriate form and format required by that particular customer's profile information.

Once the appropriate message has been converted into the appropriate form and format, the system transmits that information across the network bus 16 to the display panel 12 which is associated with the interrogator and RF receiver unit 22 which initially obtained the customer profile information, thus initiating the process. The display unit is, thus, adaptively configured to provide a particular customer with shopping information an particular desired form and format, in response to customer profile information which defines that customer's demographic profile.

In each of the embodiments described above, in connection with FIGS. 4a, 5a, 6a, and 7a, it should be recognized that the systems described will necessarily share certain features and operational requirements. In particular, each of the interrogator and RF receiver units 22 is associated with a specific and corresponding display panel 12 and the combination will be identified with either a unique bus address or some other unique addressing feature. This is necessary because each of the interrogator and display panel combinations will be placed in proximity to completely different types of goods and the messages they display will consequently differ greatly in form and content.

A specific implementation of any of the embodiments of the present invention might include an interrogator and display panel combination mounted in proximity to the dairy case of a grocery store. That interrogator and display panel in combination would be identified as "belonging to" the dairy case by having store management personnel identify its address as relating to diary products. Accordingly, when that particular interrogator interacts with a customer ID card, and transmits the customer's ID and profile information to the store computer system, the interrogator display panel combination must necessarily also transmit its own unique address as part of the information transmission packet. The store computer system recognizes the interrogator address as being that of the interrogator associated with dairy goods and, thus, is able to limit the amount of information that the data presentation selection unit 44 must access from either the basic information pool 52 or from a multiplicity of customer profile specific data sets 46. Because the interrogator address is associated with dairy goods, the data presentation selection unit 44 need only access those entries which pertain to diary goods, such as milk, butter, cheese, and the like.

It will also be evident to those having skill in the art that any particular interrogator/display panel combination can be programmed by store management personnel to display only a single informational message. For example, a particular interrogator and display panel combination might be programmed to only display "Range Free Chicken: $2.99/lb.". Given this limited informational presentation, the system need only access a single data string from a basic information pool (52 of FIGS. 6a and 7a) or from a multiplicity of data sets (46 of FIGS. 4a and 5a). The language, currency, weights and measures system and font size can be easily adjusted, in accordance with the invention, to conform to the desires or requirements of each particular customer who approaches that interrogator/display panel combination.

The hold-time for each interrogator/display panel combination may also be programmed by store management in order to accommodate differing traffic densities during different times of the day. Each of the exemplary systems operates on a first-come first-served basis with respect to customer ID cards. The first customer to enter an interrogator unit's RF field gains control of the system, at least with respect to that interrogator and display panel combination, and the display panel displays information in accordance with that particular customer's profile information for a particular period of time, defined by the hold-time for the system. Display hold-time will generally be in the range of from about 5 to about 10 seconds, following which the system will adaptively reconfigure itself to display information in accordance with the profile information received from the next customer that entered the RF field of a particular interrogator unit. Although 5 to 10 seconds hold-time is suitable for most display applications, it may not be sufficient for in cases where a large amount of information must be presented. In those cases, display hold-time may be easily lengthened by making hold-time depend on the byte length of the information being displayed. A subroutine for adapting hold-time to message length may be easily appended to the application program implementing the present invention. Creation of such a subroutine would be well within the skill of even a rudimentary programmer. The process continues with the system reverting to its default condition when all customers have been served.

It will be appreciated that a system constructed in accordance with the illustrated embodiments, above, provide a number of competitive advantages to retail stores, particularly supermarkets, in their attempt to attract customers. Such a system allows a store to communicate directly to customers without regard to language or other cultural differences. In addition, manufactures of such retail systems are able to realize the economies of scale that obtain by manufacturing and exporting a single general-purpose apparatus that is pre-programmed to take into account such national language and other national cultural differences.

Accordingly, there has been brought to the art of electronic shopping systems a shopping display system that is able to be adaptively reconfigured so as to display item pricing and indicators and other identifying information such as item size, item weight, unit price, and the like in a language, form, and format which is directed to the specific needs of a particular customer. Each particular customer's information presentation needs are expressed as customer profile codes which are used by the system in order to recognize and display information in a great variety of national languages, as well as recognize and display information in a number of different systems of weights and measures and in accordance with a number of different currencies. It will be appreciated that an electronic shopping system in accordance with the various embodiments of the invention, can be constructed in whole or in part either from special purpose-built hardware or from general purpose computer system components which is controlled by a suitable application program.

While the invention has been described with respect to particular illustrated embodiments, those skilled in the art and technology to which the invention pertains will have no difficulty devising variations which in no way depart from the invention. For example, while the illustrated embodiments have been described in connection with a store computer system, coupled to a local area network, it will be appreciated that a distributed set of network servers could be employed to like effect and utility without departing from the present invention. In addition, the communication link or links employed between the store computer system and the interrogator and display panel combinations may be a wired network configuration or wireless. Wireless communication, whether between the interrogator and store computer or between the interrogator and customer ID card, might be infrared as well as RF.

Accordingly, the present invention is not limited to the specific embodiments described above, but, rather, as defined by the scope of the appended claims.

What is claimed is:

1. An electronic personal shopping system for use in a retail facility of the type having a plurality of display locations at which merchandise items are offered for purchase, the system comprising:

a plurality of individually addressable electronic display units mounted at corresponding ones of the display locations, each display unit configured to present an information message relating to the merchandise item offered for purchase at that display location;

a plurality of interrogator units, each interrogator unit being associated with and in proximity to a corresponding one of the individually addressable electronic display units, each interrogator having a unique address assigned thereto, and each interrogator defining an interrogation area characterized by a radiation field;

a store platform computer coupled to the interrogators and display units by a bi-directional communication bus for receiving data from each interrogator unit and for transmitting a corresponding information message to the corresponding display unit;

a portable customer data card including;

means for automatically communicating with an interrogator unit upon the data card's entry into an interrogation area;

at least a memory storage area, the memory storage area holding at least a customer indicia, the customer indicia being communicated to the interrogator unit and thence to the store platform computer as data; and means for automatically adaptively reconfiguring a display unit corresponding to a particular interrogator based on profile information of a customer retrieved in response to the customer data card's entry into the interrogation area to display a corresponding information message, the adaptive reconfiguration allowing customization of a display format of the information message while preserving the message content.

2. The electronic personal shopping system according to claim 1, the portable customer data card comprising a contactless-type smart card, the means for communicating with an interrogator unit including an RF transceiver circuit, the smart card further comprising an integrated circuit processor for managing data information transfer between the memory element and the transceiver circuit, wherein the interrogator unit is configured to enter into wireless RF communication with the transceiver circuit so as to read at least customer indicia from the memory storage area.

3. The electronic personal shopping system according to claim 2, wherein the contactless-type smart card is powered by radiative induction, the radiation field characterizing the interrogation area comprising an RF induction field to power said card.

4. The electronic personal shopping system according to claim 3, the customer indicia held by the memory storage area comprising a unique customer ID, the ID being read from the smart card by the interrogator unit.

5. The electronic personal shopping system according to claim 4, the system including a customer profile message script characterized by a multiplicity of profile information fields, each profile message script associated to a corresponding unique customer ID, each profile information field containing profile entries specific to a customer, each entry selected from a list consisting of preferred national language, gender, date of birth, preferred weights and measures system, preferred currency and special status.

6. The electronic personal shopping system according to claim 5, the adaptive reconfiguring means comprising a database including a multiplicity of profile specific data sets, each data set including an item description table containing information messages for merchandise items offered for purchase at respective ones of the display locations, wherein the information messages of each table differ from one another in accordance with a selection criteria metric selected from the list consisting of preferred national language, gender, date of birth, preferred weights and measures system, preferred currency and special status.

7. The electronic personal shopping system according to claim 6, the adaptive reconfiguring means further comprising:

a profile decoder circuit, the circuit decoding a profile message script into selection criteria data;

a selection and presentation circuit for receiving selection criteria data from the profile decoder, the selection and presentation circuit selecting a particular one of the profile specific data sets for presentation on the basis of said selection criteria data;

and wherein the store platform computer directs the selected merchandise item information message to the display unit associated with the interrogator unit which received the customer's ID, thereby adaptively reconfiguring the display to present a merchandise item information message in a form specified by a customer's profile message script.

8. The electronic personal shopping system according to claim 7, wherein the merchandise item information message comprises at least an item identification.

9. The electronic personal shopping system according to claim 8, the adaptive reconfiguring means further including a data table organized as a list of entries, each entry containing a customer profile message script for a particular customer, each entry identified by a unique customer ID specific to that customer.

10. The electronic personal shopping system according to claim 9, the adaptive reconfiguring means further comprising means for matching a received customer ID to a corresponding customer profile message script, the matching means further providing the profile message script to the profile decoder circuit.

11. The electronic personal shopping system according to claim 8, the customer profile message script held in the memory storage area of the smart card, the profile message script being transmitted to the interrogator unit and thence to the store platform computer along with the customer ID.

12. The electronic personal shopping system according to claim 5, the adaptive reconfiguring means comprising:
an item description table containing item information message entries, each entry pertaining to particular ones of merchandise items offered for purchase at corresponding display locations; and
a plurality of conversion rules, each rule for converting an item information message entry into a particular form in accordance with a selection criteria metric selected from a list consisting of preferred national language, gender, date of birth, preferred weights and measures system, preferred currency and special status.

13. The electronic personal shopping system according to claim 12, the adaptive reconfiguring means further comprising:
a profile decoder circuit, the circuit decoding a profile message script into selection criteria data;
a selection and presentation circuit for receiving selection criteria data from the profile decoder, the selection and presentation circuit selecting a particular one of the converter rules for converting the item information message into a particular form for presentation on the basis of said selection criteria data; and
wherein the store platform computer directs the converted merchandise item information message to the display unit associated with the interrogator unit which received the customer's ID, thereby adaptively reconfiguring the display to present a merchandise item information message in a form specified by a customer's profile message script.

14. The electronic personal shopping system according to claim 13, wherein the merchandise item information message comprises at least an item identification.

15. The electronic personal shopping system according to claim 14, the adaptive reconfiguring means further including a data table organized as a list of entries, each entry containing a customer profile message script for a particular customer, each entry identified by a unique customer ID specific to that customer.

16. The electronic personal shopping system according to claim 15, the adaptive reconfiguring means further comprising means for matching a received customer ID to a corresponding customer profile message script, the matching means further providing the profile message script to the profile decoder circuit.

17. The electronic personal shopping system according to claim 14, the customer profile message script held in the memory storage area of the smart card, the profile message script being transmitted to the interrogator unit and thence to the store platform computer along with the customer ID.

18. In an electronic personal shopping system for use in a retail facility of the type having a plurality of display locations at which merchandise items are offered for purchase, the system including individually addressable electronic display panels associated with each display location and presenting information messages, a method for adaptively reconfiguring the form of the information messages to conform to a particular customer's demographic requirements, the method comprising:
providing an interrogator unit in association with each display panel, each interrogator unit having a unique address assigned thereto, and each interrogator unit defining an interrogation area characterized by a radiation field;
providing a store platform computer, the computer coordinating the information message presented over each display panel;
providing a bi-directional interconnection for coupling the computer to receive data from each interrogator unit and for transmitting a corresponding information message to the corresponding display unit for presentation;
providing a portable customer data card, the card including at least a memory containing a customer indicia and means for automatically communicating with an interrogator unit upon entry into an interrogation area;
providing customer profile data, the profile data defining a demographic indicia specific to a customer associated with the customer indicia;
automatically retrieving the customer profile data using the customer indicia in response to the customer data card's entry into the interrogation area; and
automatically adaptively reconfiguring a display unit corresponding to a particular interrogator based on the retrieved profile data to display the information message, the adaptive reconfiguration allowing the form of the information message to be modified to conform the message to the customer's demographic requirements.

19. The method according to claim 18, further comprising:
providing a database including a multiplicity of profile specific data sets, each data set including an item description table containing information messages for merchandise items offered for purchase at respective ones of the display locations, wherein the information messages of each table differ from one another in accordance with a selection criteria metric selected from a list consisting of preferred national language, gender, date of birth, preferred weights and measures system, preferred currency and special status.

20. The method according to claim 19, further comprising:
providing a profile decoder circuit, the circuit decoding a customer's demographic indicia into selection criteria data;
providing a selection and presentation circuit for receiving selection criteria data from the profile decoder, the selection and presentation circuit selecting a particular one of the profile specific data sets for presentation on the basis of said selection criteria data; and causing the store platform computer to direct the selected merchandise item information message to the display unit associated with the interrogator unit which received the customer indicia, thereby adaptively reconfiguring the display to present a merchandise item information message in a modified form specified by a customer's profile data.

21. The method according to claim 20, wherein the merchandise item information message comprises at least an item identification.

22. The method according to claim 21, further including providing a data table organized as a list of entries, each entry containing customer profile data for a particular customer, each entry identified by a unique customer indicia specific to that customer.

23. The method according to claim 22, further comprising;

matching a received customer indicia to a corresponding customer profile data entry; and providing the customer profile data to the profile decoder circuit.

24. The method according to claim 21, wherein the customer profile data is held in the memory of the portable customer data card, the customer profile data being transmitted to the store platform computer along with the customer indicia.

25. The method according to claim 18, further comprising:

providing an item description table containing item information message entries, each entry pertaining to particular ones of merchandise items offered for purchase at corresponding display locations; and providing a plurality of conversion rules, each rule for modifying an item information message entry by converting said item information message entry into a particular form in accordance with a selection criteria metric selected from a list consisting of preferred national language, gender, date of birth, preferred weights and measures system, preferred currency and special status.

26. The method according to claim 25, further comprising:

providing a profile decoder circuit, the circuit decoding customer profile data demographic indicia into selection criteria data;

providing a selection and presentation circuit for receiving selection criteria data from the profile decoder, the selection and presentation circuit selecting a particular one of the conversion rules for modifying the item information message into a particular form for presentation on the basis of said selection criteria data; and causing the store platform computer to transmit the modified merchandise item information message to the display unit associated with the interrogator unit which received the customer indicia, thereby adaptively reconfiguring the display to present a merchandise item information message in a modified form specified by a customer's profile data.

27. The method according to claim 26, wherein the merchandise item information message comprises at least an item identification.

28. The method according to claim 27, further including providing a data table organized as a list of entries, each entry containing customer profile data for a particular customer, each entry identified by a unique customer indicia specific to that customer.

29. The method according to claim 28, further comprising:

matching a received customer indicia to a corresponding customer profile data entry; and providing the customer profile data to the profile decoder circuit.

30. The method according to claim 27, wherein the customer profile data is held in the memory of the portable customer data card, the profile data being transmitted to the store platform computer along with the customer indicia.

31. In an electronic personal shopping system for use in a retail facility of the type having a display location at which a merchandise item is offered for purchase, the system including an electronic display panel associated with the display location, a method for presenting an information message on the display panel relating to the merchandise item offered for purchase at the display location, the method comprising:

displaying the information message on the electronic display in a first form;

automatically identifying a customer carrying a customer card in the vicinity of the electronic display;

retrieving a customer indicia from the customer card;

transmitting the customer indicia to a store platform computer;

retrieving customer profile information using the customer indicia;

automatically adaptively reconfiguring the electronic display based on the retrieved customer profile information, the adaptive reconfiguration allowing the information message to be displayed in a second form while conveying a same meaning as the information message displayed in the first form.

32. A store platform computer comprising:

a network interface for receiving data from a plurality of interrogator units, said interrogator units coupled to said network interface by a bi-directional bus, and for transmitting information messages to a plurality of display units corresponding to said interrogator units; and means for automatically adaptively reconfiguring a particular display unit to display a corresponding information message based on customer profile information of a customer retrieved in response to a customer's data card entry into an interrogation area of an interrogator unit corresponding to the particular display unit, the adaptive reconfiguration allowing customization of a display format of the information message while preserving the message content.

* * * * *